(12) United States Patent
Cho et al.

(10) Patent No.: US 8,250,945 B2
(45) Date of Patent: Aug. 28, 2012

(54) ADJUSTABLE OPERATING MECHANISM FOR KICK DOWN SWITCH

(75) Inventors: Eansoo Cho, Hwaseong-si (KR); Joonyoung Park, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 583 days.

(21) Appl. No.: 12/491,952

(22) Filed: Jun. 25, 2009

(65) Prior Publication Data
US 2010/0000362 A1 Jan. 7, 2010

(30) Foreign Application Priority Data
Jul. 4, 2008 (KR) ........................ 10-2008-0064893

(51) Int. Cl.
B60K 26/02 (2006.01)
G05G 1/30 (2008.04)
F02D 9/02 (2006.01)
F16H 59/18 (2006.01)

(52) U.S. Cl. ........................ 74/513; 200/61.89

(58) Field of Classification Search ............ 74/512–514, 74/526, 527; 200/61.89; B60K 26/02, 26/00, B60K 20/04; G05G 1/30, 5/03, 9/08; F02D 9/02; F16H 59/18
See application file for complete search history.

(56) References Cited

U.S. PATENT DOCUMENTS

| 6,167,778 B1 * | 1/2001 | Kohlen ........................ 74/513 |
| 6,360,629 B2 * | 3/2002 | Schambre et al. ............. 74/512 |
| 6,629,472 B2 * | 10/2003 | Scheidling et al. ............. 74/512 |
| 6,662,677 B2 * | 12/2003 | Rixon et al. .................... 74/512 |
| 6,955,103 B2 * | 10/2005 | Crack ............................. 74/512 |
| 6,981,486 B2 * | 1/2006 | Yone et al. ..................... 123/399 |
| 7,017,443 B2 * | 3/2006 | Kalsi .............................. 74/514 |
| 7,971,506 B2 * | 7/2011 | Dickinson ..................... 74/512 |
| 2005/0097980 A1 * | 5/2005 | Menzies ....................... 74/512 |
| 2006/0169097 A1 | 8/2006 | Peniston et al. |

FOREIGN PATENT DOCUMENTS

| DE | 4203367 A1 * | 8/1993 |
| DE | 19630156 A1 * | 1/1998 |
| JP | 3-99944 A | 4/1991 |
| JP | 2005126022 A * | 5/2005 |
| JP | 2007-182150 A | 7/2007 |
| KR | 10-2007-0047644 A | 5/2007 |
| KR | 10-2008-0045135 A | 5/2008 |
| WO | WO 0064696 A1 * | 11/2000 |
| WO | WO 0114161 A1 * | 3/2001 |
| WO | WO 0114162 A1 * | 3/2001 |
| WO | WO 2007/020163 A1 | 2/2007 |

* cited by examiner

Primary Examiner — Troy Chambers
Assistant Examiner — Gregory Prather
(74) Attorney, Agent, or Firm — Morgan, Lewis & Bockius LLP

(57) ABSTRACT

An adjustable operating mechanism for a kick down switch includes a stopper formed on a stopper bracket and having a slope surface inclined in one direction, a kick down switch including a member for providing different mechanical operating feeling and a protrusion having a slope surface corresponding to the slope surface of the stopper, and a groove formed on an acceleration pedal arm to receive the kick down switch, the kick down switch being configured and dimensioned to be movable therein to a predetermined position so that a kick down-generating time point is adjusted.

3 Claims, 5 Drawing Sheets

ADJUSTABLE OPERATING MECHANISM FOR KICK DOWN SWITCH

CROSS-REFERENCE TO RELATED APPLICATIONS

The present application claims priority to Korean Patent Application Number 10-2008-0064893 filed Jul. 4, 2008, the entire contents of which application is incorporated herein for all purposes by this reference.

BACKGROUND OF THE INVENTION

1. Field of the Invention

The present invention relates to a kick down switch attached to the accelerator pedal of a vehicle, particularly a technology that makes is possible to easily adjust a kick down-generating time point by adjusting the position of the kick down switch that is attached to the acceleration pedal arm.

2. Description of Related Art

Kick down switch equipped in vehicles in the related, which is facility that let driver know a fact that the opening of a throttle valve is above 80% when the driver operates the acceleration pedal to accelerate the vehicles in driving, allows the driver operating the acceleration pedal to sense different mechanical operating feeling when the opening of the throttle valve is above 80% by the operation of the accelerator pedal.

When the different operating feeling is transmitted to the driver as described above, the driver senses the feeling and reduces the excessive stroke of the acceleration pedal, such that the fuel efficiency is improved. Further, the driver can easily sense the acceleration of the vehicle, such that the stability of the vehicles traveling can be improved.

FIG. 1 is a perspective view showing a kick down switch attached to an acceleration pedal in the related art, in which a groove, which is recessed inside, is formed on an acceleration pedal arm 12 equipped with a pivotable acceleration pedal bracket 11 and a kick down switch 13 is positioned in the groove.

Kick down switch 13 is provided with means 13b for providing different mechanical operating feeling having a protrusion 13a protruding outside and a stopper bracket 14 equipped with a stopper is fastened to bracket 11, at a position facing protrusion 13a. According to this configuration, as a driver operates the acceleration pedal, the acceleration pedal arm pivots, and when protrusion 13a of the kick down switch touches the stopper of the stopper bracket, a sudden resisting force is applied to the acceleration pedal by the kick down switch, such that different mechanical operating feeling is transmitted to the driver operating the acceleration pedal.

The kick down switch can be applied to all types of vehicles and the kick down-generating time point needs to be adjusted according to the types of vehicles or the drivers' tastes. However, according to the structure of the kick down switch in the related art, the time point where the protrusion of the means for providing mechanical operating feeling of the kick down switch touches the stopper is limited to a specific stroke of the acceleration pedal and it is required to a new accelerator pedal using a specific mold to adjust the kick down-generating time, such that the manufacturing cost is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an operating mechanism for an adjustable kick down switch of which the kick down-generating time can be adjusted by stages, not limited to a specific stroke of an accelerator pedal, thereby reducing the manufacturing cost.

In an aspect of the present invention, an adjustable operating mechanism for a kick down switch may include a stopper formed on a stopper bracket and having a slope surface inclined in one direction, a kick down switch including a member for providing different mechanical operating feeling and a protrusion having a slope surface corresponding to the slope surface of the stopper, and a groove formed on an acceleration pedal arm to receive the kick down switch, the kick down switch being configured and dimensioned to be movable therein to a predetermined position so that a kick down-generating time point is adjusted.

A plurality of teeth may be formed at upper and/or lower sides of the groove along a movement direction of the kick down switch and a plurality of teeth corresponding to the teeth of the groove are formed at corresponding upper and lower surfaces of a housing of the kick down switch.

The housing of the kick down switch may be configured and dimensioned to mount the kick down switch and the member and be elastically engaged with the groove.

A stroke of the acceleration pedal may be defined as about 90%, about 85%, and about 80% of entire stroke, respectively, according to position of a contact point between the slope surfaces of the stopper and the protrusion of the kick down switch when the slope surface of the protrusion touches the slope surface of the stopper.

Accordingly, it is easy to adjust the kick down-generating time point when the two slopes contact each other by changing the position of the kick down switch to the left or right, such that it is possible to the apply the kick down switch to all types of vehicles and adjust the kick down-generating time point by stages in accordance with the consumer's tastes. Therefore, it is not required to make a new mold even if the kick down-generating time point is changed, thereby reducing the manufacturing cost of the vehicles. Further, it is easy to attach the kick down switch, such that the productivity is improved.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
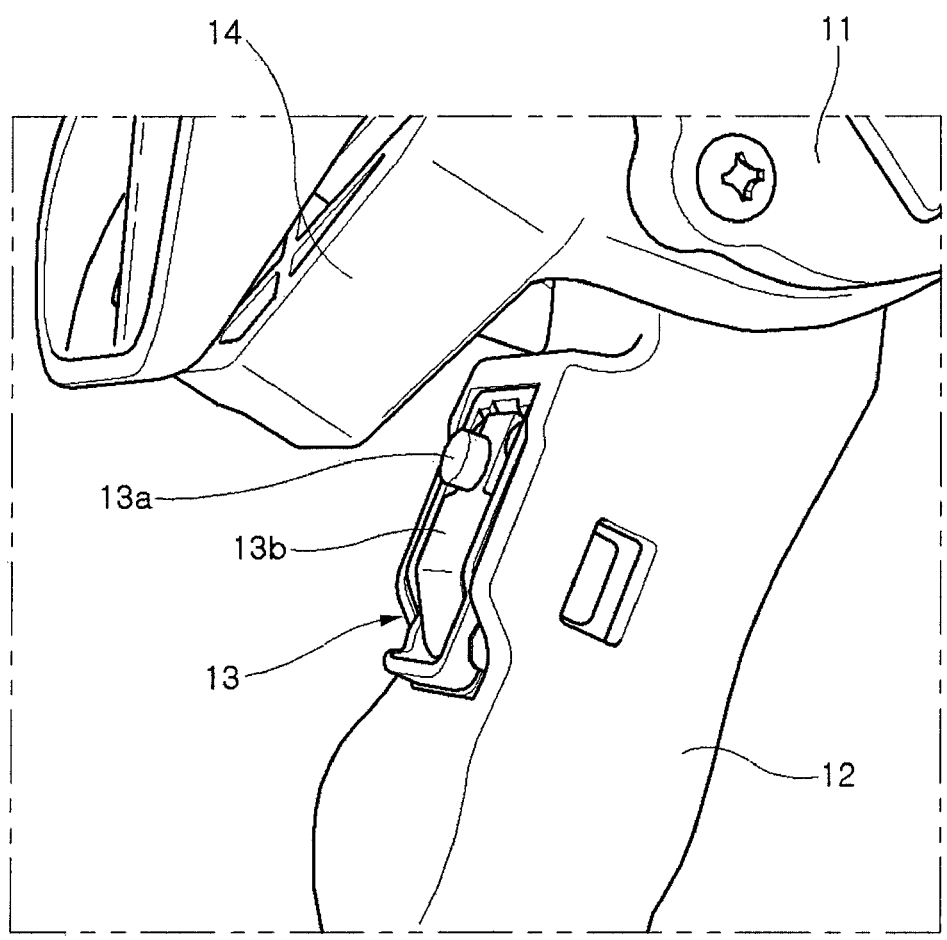
FIG. 1 is a perspective view of a kick down switch attached according to the related art.
Figure 2:
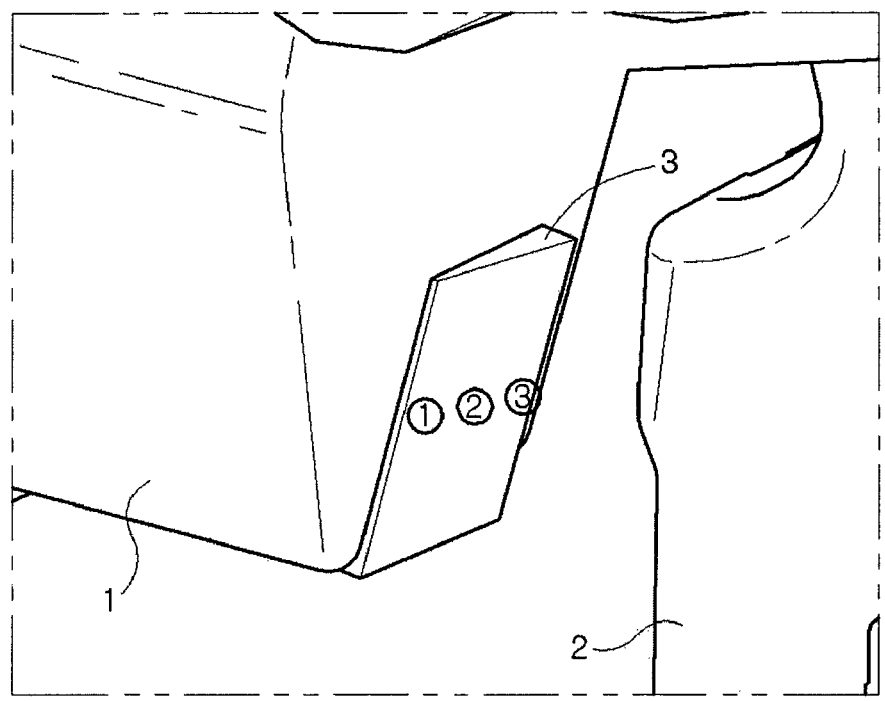
FIG. 2 is a perspective view of an exemplary stopper according to the invention.

FIG. 2 is a perspective view of a stopper bracket with a stopper according to various embodiments of the invention, in which a stopper 3 protruding toward an accelerator pedal arm 2 is integrally formed to a stopper bracket 1 attached to an acceleration pedal bracket.

The stopper 3 is substantially a rectangular block with the upper surface facing acceleration pedal arm 2 and inclined in one direction. Therefore, the protrusion height toward the acceleration pedal arm is the smallest at the position ① on the upper surface of the stopper and the largest at the position ③, and is medium at the position ②.

Figure 3:
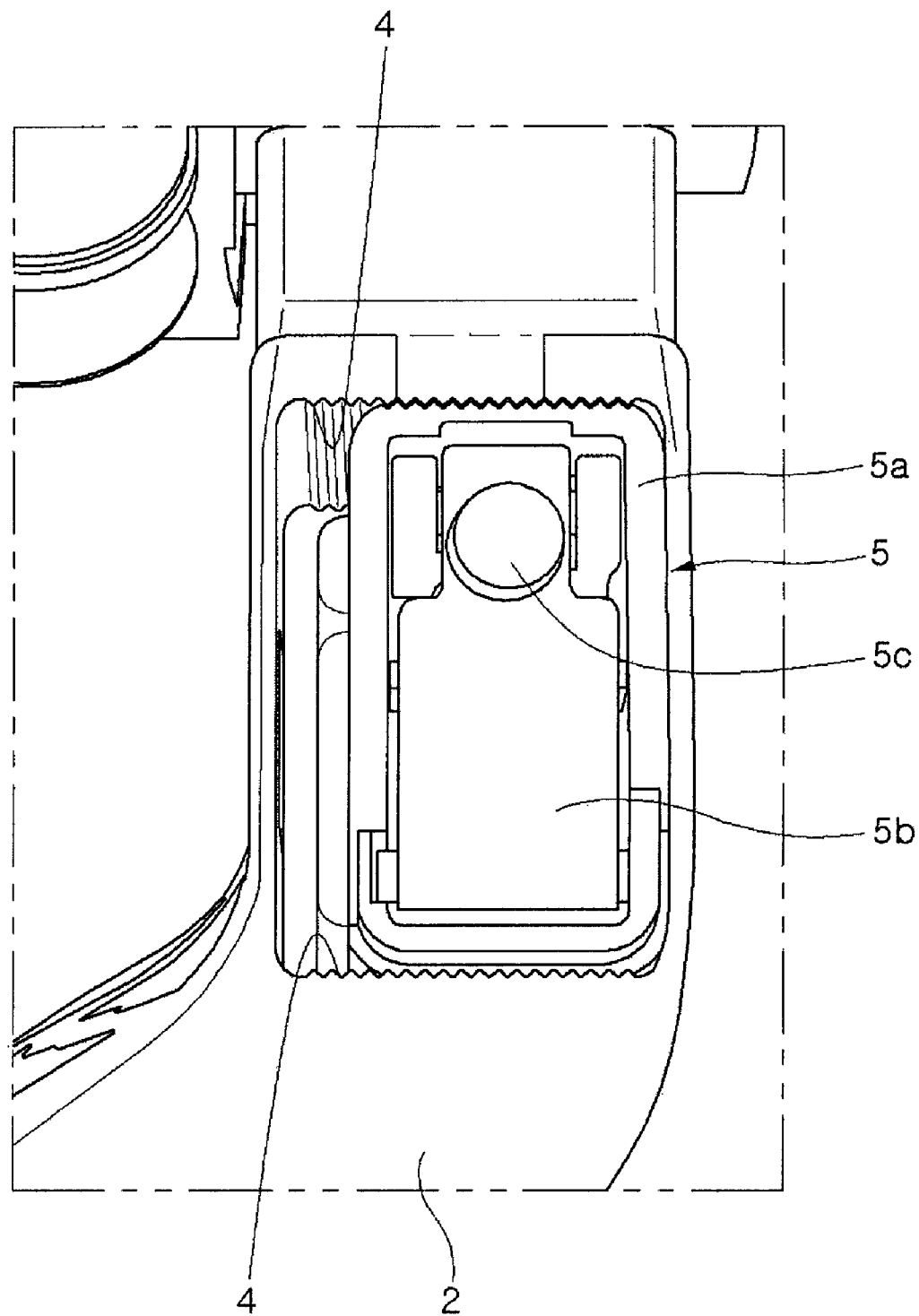
FIGS. 3-5 are a plan view showing that an exemplary kick down switch positioned in a groove of an acceleration pedal arm according to the invention.

FIG. 3 is a plan view of the kick down switch attached to the acceleration pedal arm, in which a substantially rectangular groove, which is recessed inside, is formed on acceleration pedal arm 2 and a plurality of teeth 4 are longitudinally formed at the upper 6a and 6b lower sides of the groove.

Kick down switch 5, which is received in the groove, has a kick down switch housing 5a with a plurality of teeth on the upper 6a and 6b lower sides corresponding to the above-mentioned teeth and a member 5b for providing mechanical operating feeling that is disposed in the housing and provides a different mechanical operating feeling to the acceleration pedal arm. Further, the member 5b has a protrusion 5c protruding toward stopper 3 and the upper surface of protrusion 5c is inclined to correspond to the slope of the stopper.

Therefore, kick down switch 5 is inserted in the groove, moved to the left or right side therein, and then fixed to an appropriated position by the teeth. When the kick down switch is positioned at a side in the groove as shown in FIG. 3, the protrusion faces the position ① of the stopper, such that the stroke of the acceleration pedal arm is the largest when the protrusion touches the stopper. This is because the protrusion height is the smallest at the position ① of the stopper.

Assuming that the stroke of the acceleration pedal is 90% of the entire stroke when the protrusion of the member 5b touches the position ① of the stopper, the different mechanical operating feeling is provided when the stroke of the acceleration pedal is 90%.

Figure 4:
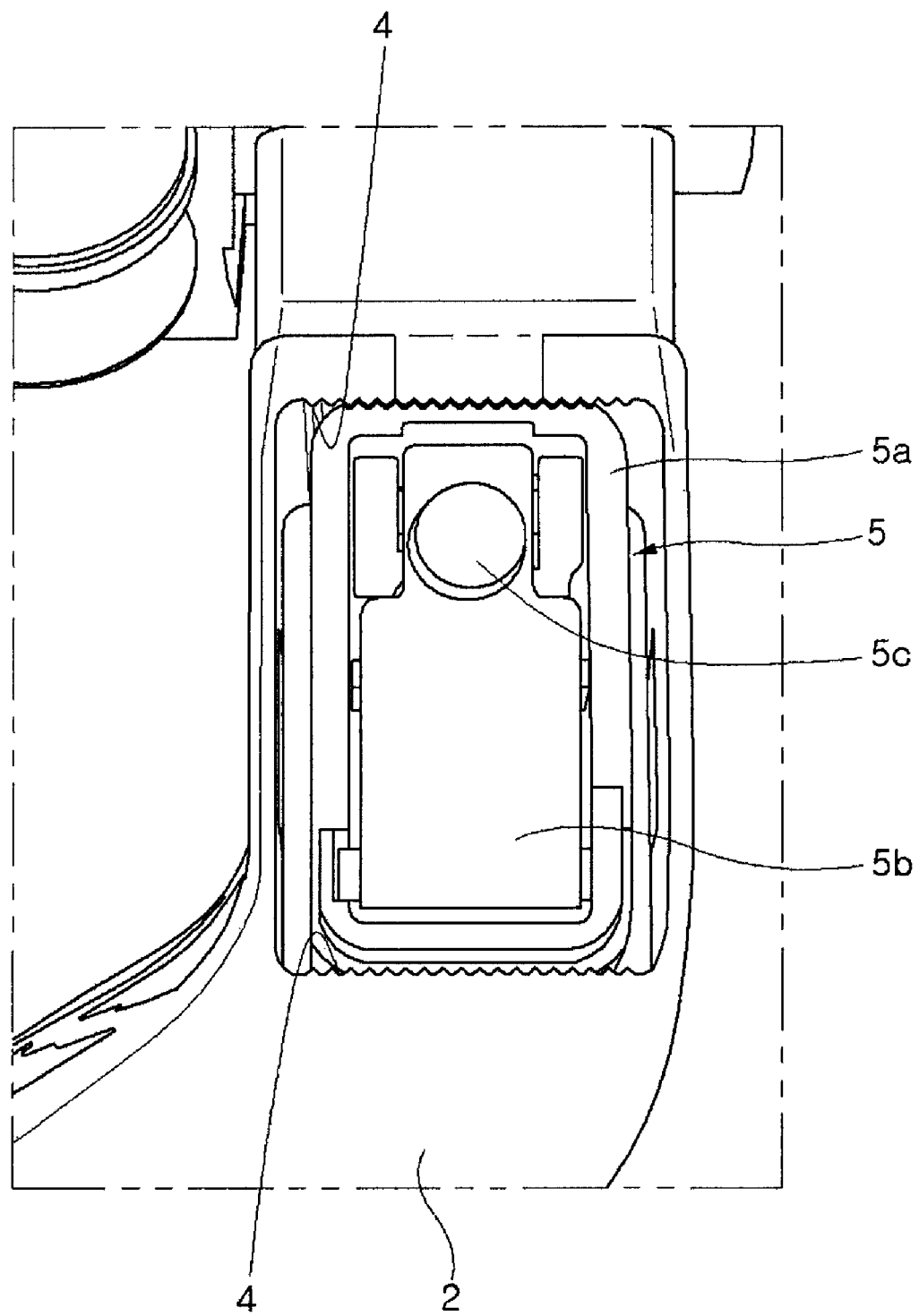

FIG. 4 is a view showing the kick down switch positioned and fixed to the middle portion in the groove, in which as the acceleration pedal is operated, the protrusion 5c of the member 5b touches the position ② of the stopper, and assuming that the stroke of the acceleration pedal is 85% of the entire stroke at this time point, the different mechanical operating feeling is provided when the stroke of the acceleration pedal is 85%.

Figure 5:
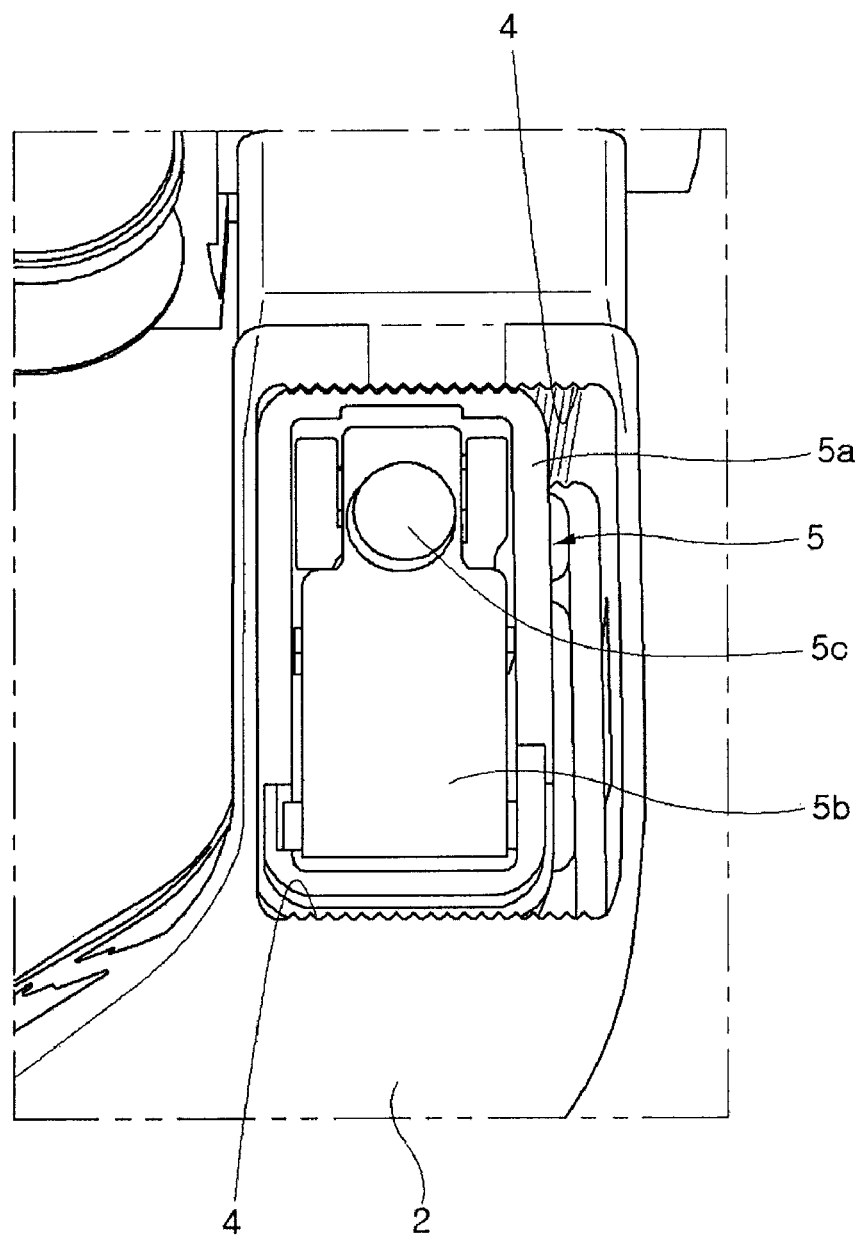

FIG. 5 is a view showing the kick down switch fixed to the other side in the groove, in which as the acceleration pedal is operated, the protrusion 5c of the member 5b of the kick down switch touches the position ③ of the stopper, and assuming that the stroke of the acceleration pedal at this time point is 80% of the entire stroke, the different mechanical operating feeling is provided when the stroke of the acceleration pedal is 80%.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An adjustable operating mechanism for a kick down switch, comprising:
    a stopper formed on a stopper bracket and having a slope surface inclined in one direction;
    a kick down switch including a member for providing different mechanical operating feeling and a protrusion having a slope surface corresponding to the slope surface of the stopper; and
    a groove formed on an acceleration pedal arm to receive the kick down switch, the kick down switch being configured and dimensioned to be movable therein to a predetermined position so that a kick down-generating time point is adjusted;
    wherein a plurality of teeth are formed on at least one of an upper or a lower side of the groove along a movement direction of the kick down switch and a plurality of teeth corresponding to the teeth of the groove are formed at corresponding upper and lower surfaces of a housing of the kick down switch.

2. The adjustable operating mechanism for a kick down switch as defined in claim 1, wherein the housing of the kick down switch is configured and dimensioned to mount the kick down switch and the member and be elastically engaged with the groove.

3. The adjustable operating mechanism for a kick down switch as defined in claim 1, wherein a stroke of the acceleration pedal is defined as about 90%, about 85%, and about 80% of entire stroke, respectively, according to position of a contact point between the slope surfaces of the stopper and the protrusion of the kick down switch when the slope surface of the protrusion touches the slope surface of the stopper.

* * * * *